(12) United States Patent
Rigg et al.

(10) Patent No.: US 11,402,115 B2
(45) Date of Patent: Aug. 2, 2022

(54) SYSTEMS AND METHODS FOR DYNAMICALLY CONFIGURABLE THERMOSTAT INSTALLATION

(71) Applicant: Johnson Controls Technology Company, Auburn Hills, MI (US)

(72) Inventors: Brian D. Rigg, Douglass, KS (US); Shaun B. Atchison, Wichita, KS (US); Theresa N. Gillette, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 17/081,658

(22) Filed: Oct. 27, 2020

(65) Prior Publication Data
US 2021/0140665 A1    May 13, 2021

Related U.S. Application Data

(60) Provisional application No. 62/934,366, filed on Nov. 12, 2019.

(51) Int. Cl.
*F24F 11/49*    (2018.01)
*F24F 1/00*    (2019.01)
(Continued)

(52) U.S. Cl.
CPC ............... *F24F 11/49* (2018.01); *F24F 1/00* (2013.01); *F24F 11/56* (2018.01); *F24F 11/64* (2018.01); *F24F 11/65* (2018.01); *G05B 19/042* (2013.01); *F24F 2120/12* (2018.01); *F24F 2140/40* (2018.01); *G05B 2219/2614* (2013.01)

(58) Field of Classification Search
CPC ....................................................... F24F 1/00
See application file for complete search history.

(56) References Cited

U.S. PATENT DOCUMENTS 9,765,984 B2    9/2017  Smith et al.
2015/0276239 A1*  10/2015  Fadell ................. F24D 19/1009
237/2 A
(Continued)

FOREIGN PATENT DOCUMENTS

WO    2015148596 A1    10/2015

*Primary Examiner* — Nathan L Laughlin
(74) *Attorney, Agent, or Firm* — Fletcher Yoder P.C.

(57) ABSTRACT

The present disclosure includes systems and methods for pre-programming a thermostat such that operational parameters of the thermostat may be selected by an installer during installation based at least in part on a location of the thermostat. For example, a thermostat communicatively coupled to conditioned air equipment may include location determination logic configured to determine a location of the thermostat with respect to a building for which the conditioned air equipment operates. The thermostat also includes conditioned air equipment control logic comprising a plurality of sets of static location-based temperature control algorithms. Each set of the static location-based temperature control algorithms corresponds to a location of the thermostat with respect to the building. The conditioned air equipment control logic is configured to control operation of the conditioned air equipment using a set of the static location-based temperature control algorithms that corresponds to the location determined by the location determination logic.

22 Claims, 13 Drawing Sheets

(51) Int. Cl.
*F24F 11/56* (2018.01)
*F24F 11/64* (2018.01)
*G05B 19/042* (2006.01)
*F24F 11/65* (2018.01)
*F24F 120/12* (2018.01)
*F24F 140/40* (2018.01)

(56) References Cited

U.S. PATENT DOCUMENTS

| | | | |
|---|---|---|---|
| 2016/0131385 A1* | 5/2016 | Poplawski | H04W 4/20 |
| | | | 700/278 |
| 2016/0327293 A1* | 11/2016 | Grabowski | F24F 11/30 |
| 2018/0010818 A1* | 1/2018 | Maruyama | F24F 11/62 |
| 2018/0017274 A1 | 1/2018 | Erdman et al. | |
| 2018/0124178 A1* | 5/2018 | Alberth, Jr. | H04L 67/12 |

* cited by examiner

SYSTEMS AND METHODS FOR DYNAMICALLY CONFIGURABLE THERMOSTAT INSTALLATION

CROSS-REFERENCE TO RELATED APPLICATION

This application claims priority from and the benefit of U.S. Provisional Application Ser. No. 62/934,366, entitled "SYSTEMS AND METHODS FOR DYNAMICALLY CONFIGURABLE THERMOSTAT INSTALLATION," filed Nov. 12, 2019, which is herein incorporated by reference in its entirety for all purposes.

BACKGROUND

The present disclosure generally relates to pre-programming a thermostat to be dynamically configurable during installation with a heating, ventilation, and/or air conditioning (HVAC) system and, more particularly, to pre-programming a thermostat such that operational parameters of the thermostat may be selected by an installer during installation based at least in part on a location of the thermostat.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An installer, such as a homeowner, business owner, HVAC technician, and so forth, may install a thermostat by communicatively coupling the thermostat with an HVAC system of a building. Most thermostats may be controlled via a user interface of the thermostat. To enable such control, the thermostat may be pre-programmed with temperature control algorithms that dictate the control commands that the thermostat communicates to the HVAC system to which the thermostat is communicatively coupled. In many instances, the thermostat may be configured with temperature control algorithms that merely determine the control commands based on temperatures proximate the thermostat, without taking into account the location of the thermostat within the building.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a thermostat communicatively coupled to conditioned air equipment includes location determination logic configured to determine a location of the thermostat with respect to a building for which the conditioned air equipment operates. The thermostat also includes conditioned air equipment control logic comprising a plurality of sets of static location-based temperature control algorithms. Each set of the static location-based temperature control algorithms corresponds to a location of the thermostat with respect to the building. The conditioned air equipment control logic is configured to control operation of the conditioned air equipment using a set of the static location-based temperature control algorithms that corresponds to the location determined by the location determination logic.

In another embodiment, a method includes communicatively coupling, via a communication interface of a thermostat, the thermostat to conditioned air equipment. The method also includes determining, via location determination logic of the thermostat, a location of the thermostat with respect to a building for which the conditioned air equipment operates. The method further includes accessing, via conditioned air equipment control logic of the thermostat, a plurality of sets of static location-based temperature control algorithms. Each set of the static location-based temperature control algorithms corresponds to a location of the thermostat with respect to the building. In addition, the method includes controlling, via the conditioned air equipment control logic of the thermostat, operation of the conditioned air equipment using a set of the static location-based temperature control algorithms that corresponds to the location determined by the location determination logic.

In yet another embodiment, a tangible, non-transitory, computer-readable medium stores instructions executable by a processor of a thermostat that, when executed by the processor, cause the processor to communicatively couple the thermostat to conditioned air equipment. The instructions, when executed by the processor, also cause the processor to determine a location of the thermostat with respect to a building for which the conditioned air equipment operates. The instructions, when executed by the processor, further cause the processor to access a plurality of sets of static location-based temperature control algorithms stored in the computer-readable medium. Each set of the static location-based temperature control algorithms corresponds to a location of the thermostat with respect to the building. In addition, the instructions, when executed by the processor, cause the processor to control operation of the conditioned air equipment using a set of the static location-based temperature control algorithms that corresponds to the determined location of the thermostat with respect to the building.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
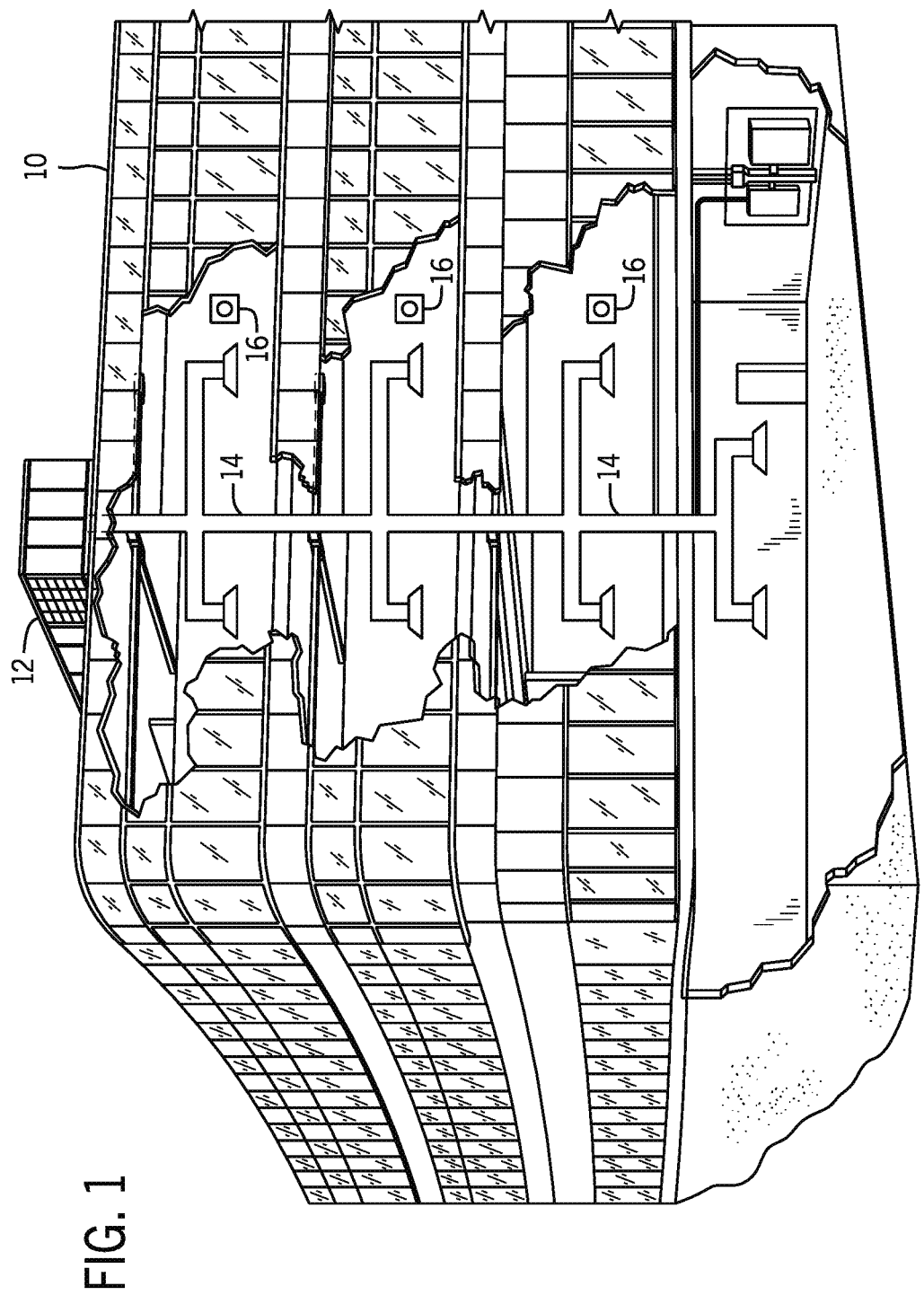
FIG. 1 illustrates a heating, ventilation, and/or air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The hardware and internal software of a thermostat that is used to determine a room's indoor temperature is unique for the particular design of the thermostat. During a development phase of a thermostat, an internal software algorithm may be developed to support the hardware design. However, a continued concern all thermostats face post-production is the placement in which the installer locates the thermostat. For example, if the installer places the thermostat next to an HVAC return or supply, window, door, and so forth, there thermostat will trace indoor temperatures differently. As described in greater detail herein, an installer may be provided with a selectable setting that allows the installer to set the location in which the thermostat is located. The unique hardware of the thermostat may have various indoor temperature software algorithms pre-programmed into the thermostat may enable the thermostat to adapt to its installed location, thereby fixing temperature accuracy issues that conventional thermostats experience. For example, during a software design process for the thermostat, several thermostat placements may be tested, and unique algorithms may be designed to support various install locations. Then, during installation of the thermostat, the installer may be provided with placement location options, which may be selected, allowing the thermostat to adapt to all types of unique installations. Conventional thermostat indoor temperature algorithms generally operate on a single algorithm when the hardware is developed. In general, the placement location testing may be tested against a known calibrated indoor temperature instrument.

The present disclosure is directed to heating, ventilation, and/or air conditioning (HVAC) systems which may be controlled via a thermostat. Particularly, the thermostat may measure a temperature and humidity level of its local environment, which may change depending the location of the thermostat within a building. In this manner, the HVAC system may provide cooled or heated air to adjust a temperature of the local environment of the thermostat to match a set-point temperature. Indeed, it is possible that a user may move the thermostat into a particular area or room of a building to accurately condition the particular area or room to a suitable comfort level. The thermostat may be pre-programmed with static temperature control algorithms that may be selected by an installer of the thermostat in the particular area or room of the building based at least in part of the particular location within the building at which the thermostat is installed. In particular, the pre-programmed static temperature control algorithms may be determined by specific locations within a building such that the installer may select a set of static temperature control algorithms by selecting the corresponding location with the building. As such, the processing circuitry required for the thermostat may be of relatively low specifications, thereby reducing the relative cost of the thermostat while also increasing the temperature accuracy of the thermostat.

As used herein, the term "thermostat" is intended to mean any control device configured to control temperature and/or other parameters of a local environment such as humidity, pressure, and so forth. However, the term "thermostat" as used herein is not intended to be limited to conventional forms of thermostats, such as conventional thermostats that, for example, include user interfaces that may be manipulated by users to set certain setpoints for the thermostat, such as temperature setpoints, for the local environment being monitored by the particular thermostat. For example, as described in greater detail herein, certain embodiments of the present disclosure may include a thermostat that may instead be communicatively coupled to an external electronic computing device, such as a smartphone, a wearable device, a tablet, a laptop, a personal computer, and so forth, which may include a user interface that may instead be used to set certain setpoints for the thermostat. In other words, the embodiments of a thermostat described herein are not intended to be limited to any conventional forms.

Turning now to the drawings, FIG. 1 illustrates a heating, ventilation, and/or air conditioning (HVAC) system for building environmental management that may employ one or more HVAC units. In the illustrated embodiment, a building 10 is air conditioned by a system that includes an HVAC unit 12 or a conditioned air unit. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may include a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the target temperature or temperature setpoint of the conditioned air. The control device 16 also may be used to control the flow of air through the ductwork 14. For example, the control device 16 may be used to regulate operation of one or more components of the HVAC unit 12 or other components, such as dampers and/or fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
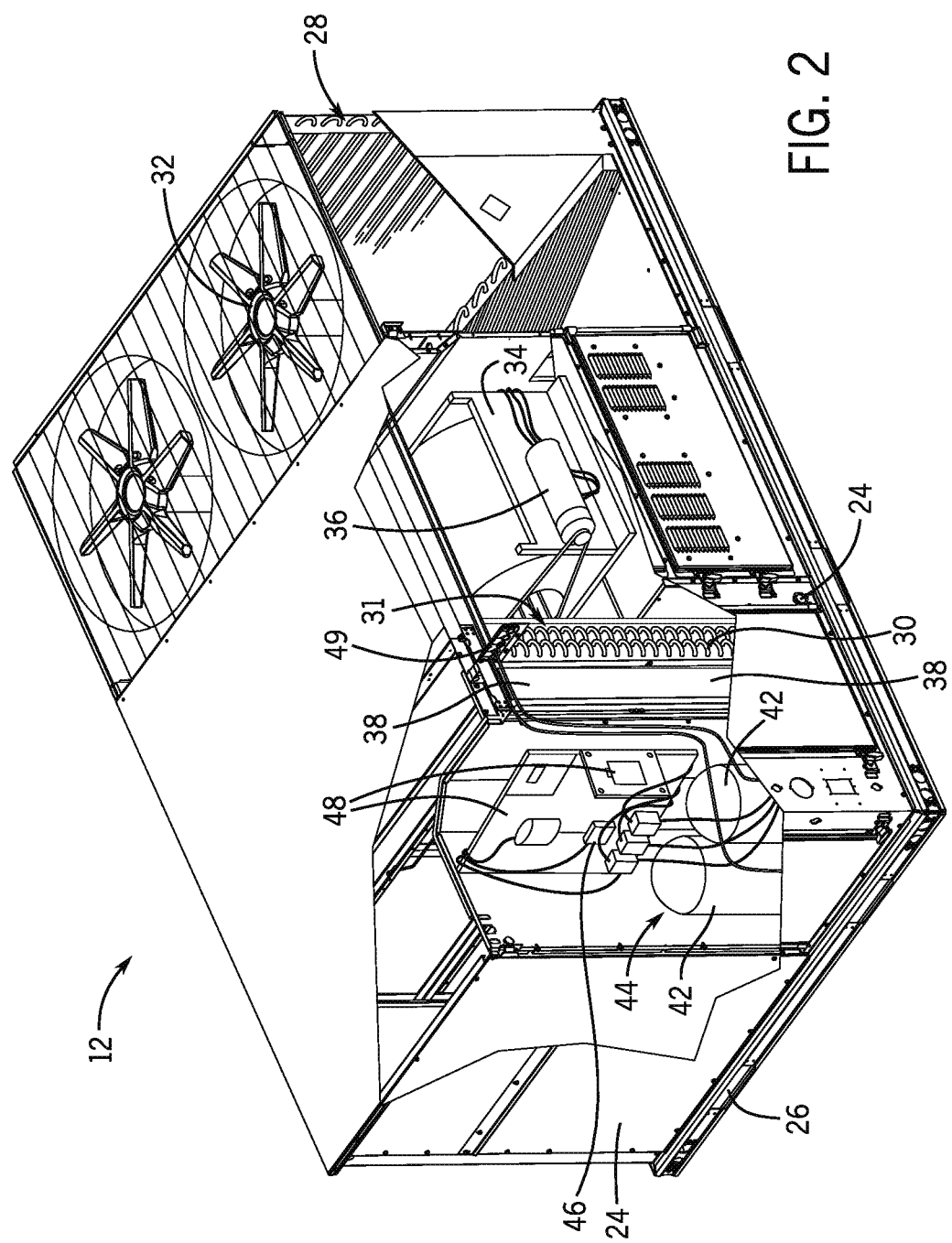
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 to provide structural support and/or protect internal components from environmental contaminants and/or other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air.

For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 may draw air from the environment through the heat exchanger 28. Air may be heated and/or cooled as the air flows through the heat exchanger 28 before being released back to the environment surrounding the rooftop unit 12. A blower assembly 34, powered by a motor 36, may draw air through the heat exchanger 30 to heat or cool the air. The heated or cooled air may be directed to the building 10 via the ductwork 14 that is connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 may increase the pressure and/or temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed and/or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
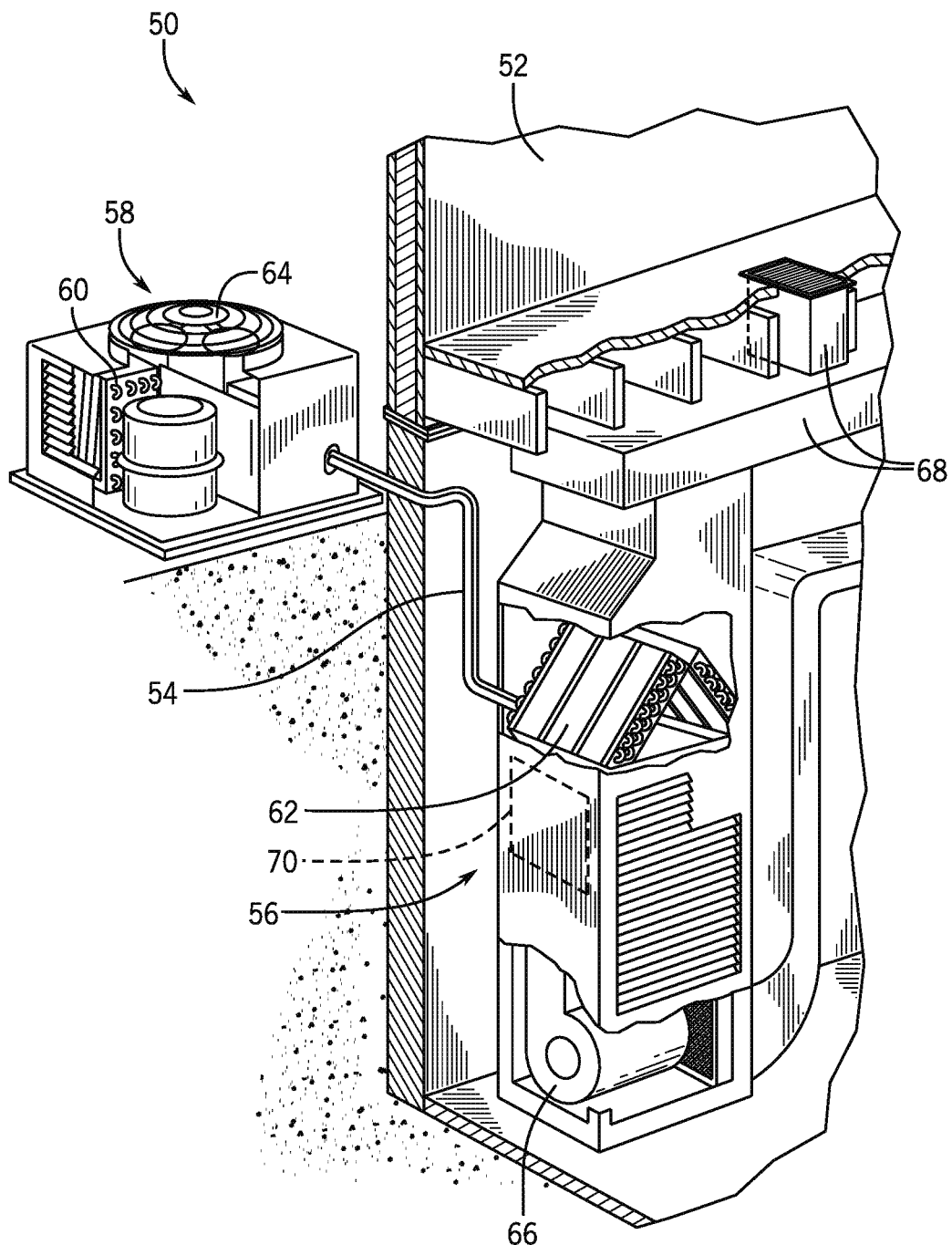
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated air to a residential structure, cooled air to the residential structure, outside air for ventilation, and/or provide improved indoor air quality (IAQ) through devices, such as ultraviolet lights and/or air filters. In the illustrated embodiment, the residential heating and cooling system 50 is a split HVAC system.

In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud, for example, to protect the system components and/or to prevent leaves, other debris, or other contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner or a cooling mode, a heat exchanger 60 in the outdoor unit 58 may serve as a condenser for re-condensing vaporized refrigerant flowing from the indoor unit 56 to the outdoor unit 58 via one of the refrigerant conduits 54. In these applications, a heat exchanger 62 of the indoor unit may function as an evaporator. Specifically, the heat exchanger 62 may receive liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner or cooling mode, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52.

The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump or heating mode. When operating as a heat pump or a heating mode, the roles of heat exchangers 60 and 62 may be reversed. That is, the heat exchanger 60 of the outdoor unit 58 may serve as an evaporator to evaporate refrigerant and thereby cool air entering the outdoor unit 58 as the air passes over outdoor the heat exchanger 60. Additionally, the indoor heat exchanger 62 may receive a stream of air blown over it and heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
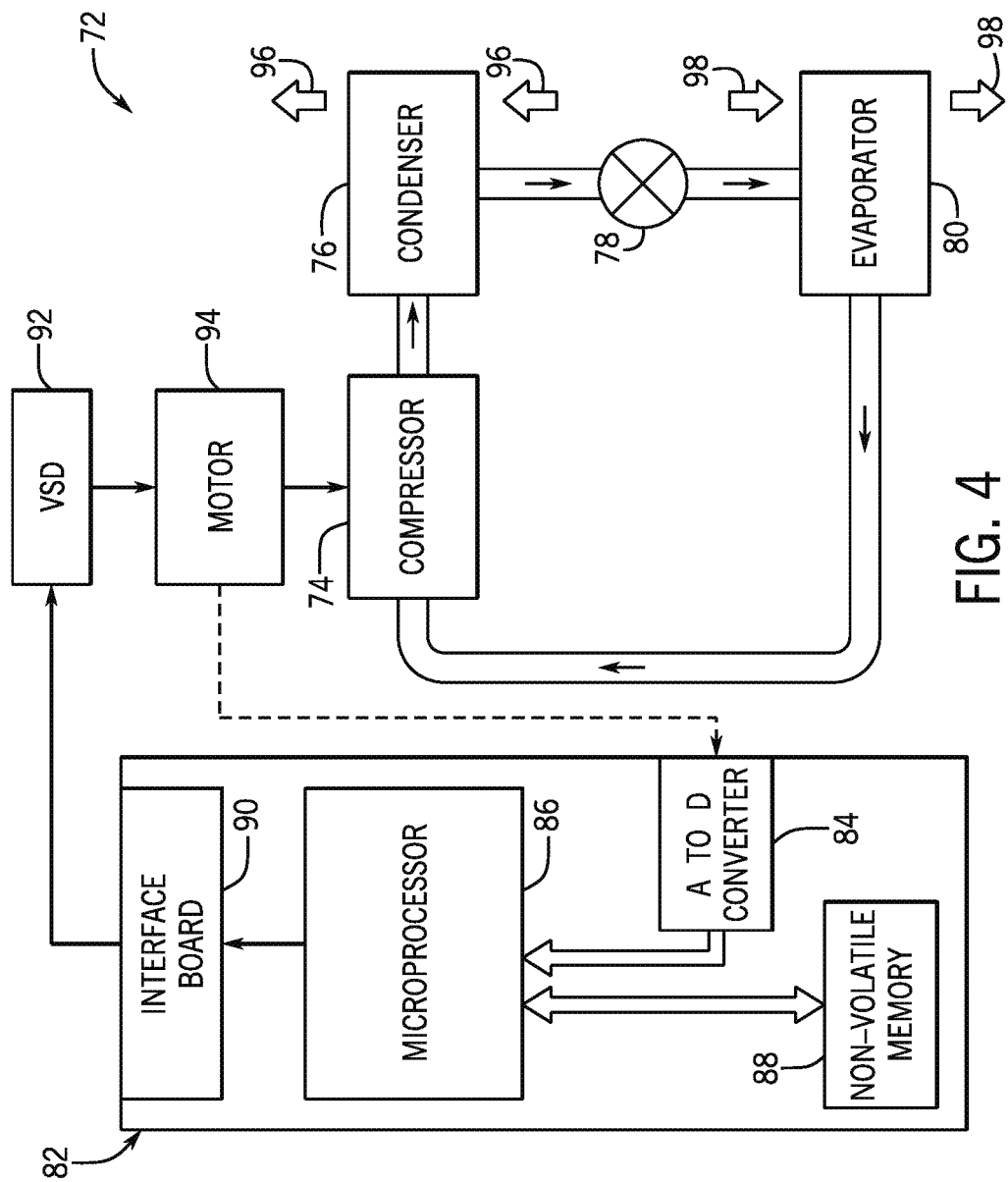
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, one or more expansion valves or expansion devices 78, and an evaporator 80. The vapor compression system 72 may further include a control panel 82 that has an analog to digital (A/D) converter 84, a microprocessor 86, non-volatile memory 88, and/or an interface board 90. The control panel 82 and its components may regulate operation of the vapor compression system 72 based on feedback, for example, received from an operator, sensors of the vapor compression system 72, and/or the like.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. In some embodiments, the VSD 92 may receive alternating current (AC) power having a particular fixed line voltage and fixed line frequency from an AC power source and provide electrical power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 may compress a refrigerant vapor and deliver the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant may exit the evaporator 80 and return to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and reheat the supply air stream 98 when the supply air stream 98 is overcooled, for example, to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference FIGS. 1-4 is intended to be illustrative of the context of the present disclosure. The techniques of the present disclosure may update features of the description above. In particular, as will be discussed in greater detail herein, a thermostat may be pre-programmed with a plurality of selectable location settings that enable an installer of the thermostat to set the location of the thermostat within the building the thermostat is installed. The unique hardware of the thermostat may have a plurality of sets of static location-based temperature control algorithms that correspond to the plurality of selectable location settings, which may be set according the location selected by the installer, thereby improving thermostat installation processes. In other words, the static location-based temperature control algorithms described herein do not change during operation of the thermostat, but rather remain constant during operation of the thermostat, and the particular set of temperature control algorithms that are used by the thermostat are modified by the selection of the location of the thermostat. Because the location-based temperature control algorithms pre-programmed into the thermostat are static, the thermostat may include relatively simplistic circuitry that, for example, may require only minimal processing power, as opposed to thermostats that include relatively processor-intensive algorithms.

Figure 5:
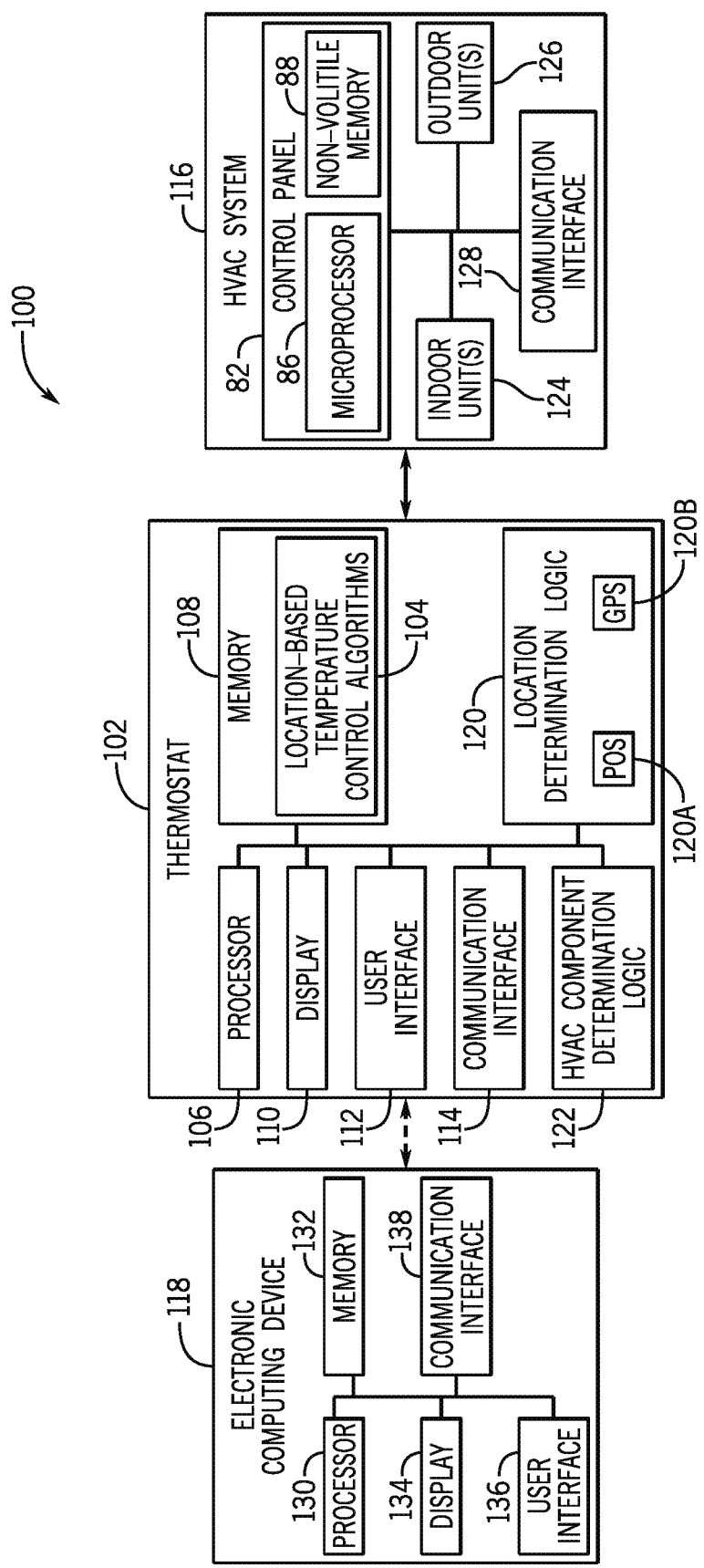
FIG. 5 illustrates a block diagram of a system that facilitates pre-programming of a thermostat with a plurality of sets of static location-based temperature control algorithms, in accordance with an embodiment of the present disclosure.

To help illustrate, FIG. 5 illustrates a block diagram of a system 100 that facilitates pre-programming of a thermostat 102 with a plurality of sets of static location-based temperature control algorithms 104 that, in turn, facilitates installation of the thermostat 102 at specific locations within a building 10, in accordance with an embodiment of the present disclosure. As described in greater detail herein, the thermostat 102, as the control device 16, may designate the target temperature or temperature setpoint for conditioned air and/or control the flow of air through the ductwork 14 of the building 10. In certain embodiments, the thermostat 102 may include a processor 106 that may control the thermostat 102, and a memory 108 communicatively coupled to the processor 106 that may store information associated with the thermostat 102, including instructions to control the thermostat 102 in accordance with a selected set of the plurality of sets of static location-based temperature control algorithms 104 that are pre-programmed into the memory 108 of the thermostat 102, wherein the selected set of the plurality of sets of static location-based temperature control algorithms 104 is selected based on a location within the building 10 that is selected by an installer of the thermostat 102. As such, as used herein, the processor 106 and the memory 108 of the thermostat 102 may be referred to as conditioned air equipment control logic insofar as the processor 106 and the memory 108 of the thermostat 102 may be used to control operation of the HVAC system 116 or other conditioned air equipment, for example, based at least in part on the static location-based temperature control algorithms 104 that are pre-programmed into the memory 108 of the thermostat 102. In certain embodiments, the static location-based temperature control algorithms 104 may be pre-programmed into the memory 108 of the thermostat 102 based at least in part on test data for the particular hardware of the thermostat 102, as well as other parameters such as a floor plan for the particular building 10 within which the thermostat 102 may be installed, a geographical location of the building 10 within which the thermostat 102 may be installed, the types of HVAC components that the thermostat 102 may control, and so forth.

In certain embodiments, the thermostat 102 may also include a display 110 that outputs information to be viewed by a user, such as an installer or homeowner, of the thermostat 102. For example, in certain embodiments, as described in greater detail herein, the display 110 may display icons relating to a plurality of locations within the building 10 in which the thermostat 102 is installed, such the a particular location of the thermostat 102 within the building 10 may be selected by an installer of the thermostat 102 such that a set of static location-based temperature control algorithms 104 corresponding to the selected location may be executed by the processor 106 of the thermostat 102 to control operation of the thermostat 102 according to the particular location of the thermostat 102 within the building 10. In certain embodiments, the thermostat 102 may include a user interface 112 that enables the thermostat 102 to receive inputs from a user of the thermostat 102 and/or to provide information to the user of the thermostat 102. In certain embodiments, the user interface 112 may be provided via the display 110, which may be in the form of a touchscreen. Additionally or alternatively, the user interface 112 may include buttons, dials, a keypad, a trackpad, or the like. Typically, the user interface 112 may enable the user of the thermostat 102 to adjust a target temperature for a room of the building 10 or the building 10 itself, and the display 110 may show or a display a visual representation of the target temperature and/or the current temperature in the room of the building 10 or the building 10 itself.

Although described herein as being configured to receive inputs from users via the user interface 112 of the thermostat 102, in other embodiments, the thermostat 102 may additionally, or instead, receive inputs from users via a user interface of an electronic computing device external to the thermostat 102, such as a smartphone, a wearable device, a tablet, a laptop, a personal computer, and so forth. Indeed, in certain embodiments, the thermostat 102 may not include a display 110 or a user interface 112.

In certain embodiments, the thermostat 102 may include a communication interface 114 communicatively coupled to the processor 106 that may enable the thermostat 102 to send and receive control signals to and from, for example, an HVAC system 116 such as the HVAC systems illustrated in FIGS. 1-4. Specifically, the thermostat 102 may send and receive control signals to and from the HVAC system 116 to control the HVAC system 116 in accordance with a set of static location-based temperature control algorithms 104 corresponding to a selected location, as described in greater detail herein. In certain embodiments, the communication interface 114 may also enable the thermostat 102 to communicate with another electronic computing device 118 via a communication network, which may be used as a thermostat programming system, as described in greater detail herein.

In certain embodiments, the thermostat 102 may include location determination logic 120 that may determine a location of the thermostat 102 with respect to a building 10 for which the thermostat 102 is installed, which may be used to determine which set of static location-based temperature control algorithms 104 will be used to control the HVAC system 116. For example, as described in greater detail herein, in certain embodiments, the location determination logic 120 may be configured to determine the location of the thermostat 102 with respect to the building 10 based at least in part on an input received via a user interface, for example, via the user interface 112 of the thermostat 102 itself. Specifically, in certain embodiments, an installer or other user of the thermostat 102 may select a particular location of the thermostat 102 with respect to the building 10 from a menu of location options displayed to the installer or other user of the thermostat 102, and the thermostat 102 may select an appropriate set of static location-based temperature control algorithms 104 corresponding to the selected location to use to control operation of the HVAC system 116.

In addition, although primarily described herein as facilitating selection, by an installer or other user, of a location of the thermostat 102 with respect to the building 10 within which the thermostat 102 is installed, in other embodiments, the location determination logic 120 may instead automatically, for example, without manual input or other intervention of an installer or other user, determine the location of the thermostat 102 with respect to the building 10, which may instead be used to set the specific static location-based temperature control algorithms 104 for the thermostat 102. For example, in certain embodiments, a position sensor 120A of the thermostat 102 may automatically detect a position of the thermostat 102 with respect to the building 10 within which the thermostat 102 is installed, and the thermostat 102 may select an appropriate set of static location-based temperature control algorithms 104 corresponding to the location automatically detected by the position sensor 120A to use to control operation of the HVAC system 116.

Furthermore, in certain embodiments, the location determination logic 120 may also be configured to automatically determine a geographical location of the thermostat 102, which may also be used to determine which set of static location-based temperature control algorithms 104 will be used to control the HVAC system 116. For example, in such embodiments, the location determination logic 120 may also be configured to select an appropriate set of static location-based temperature control algorithms 104 for the thermostat 102 based at least in part on the geographical location of the thermostat 102 determined by the location determination logic 120, for example, via global positioning system (GPS) sensors 120B of the thermostat 102. In other words, in such embodiments, both the local location of the thermostat 102 within the building 10 as well as the geographical location of the thermostat 102 may be parameters that are used to select an appropriate set of static location-based temperature control algorithms 104 for use by the thermostat 102 to control operation of the HVAC system 116. Specifically, in certain embodiments, each set of static location-based temperature control algorithms 104 may correspond not only to a particular local location of the thermostat 102 with respect to the building 10 within which the thermostat 102 is installed, but also may correspond to a particular global location of the building 10 within which the thermostat 102 is installed.

It should be understood that the use of the term "logic" in the present disclosure may refer to any suitable implementation or medium, such as in hardware or other circuitry and/or software or one or more software applications. In other words, the location determination logic 120 may be implemented as hardware, software, or a combination of hardware and software elements. For example, the hardware of the location determination logic 120 may include the position sensors 120A, GPS sensors 120B, and so forth, described herein.

In certain embodiments, the thermostat 102 may also include HVAC component determination logic 122 or conditioned air determination logic that may determine components or conditioned air equipment, such as indoor unit 124 and/or outdoor units 126, of the HVAC system 116 and associated information or parameters. For example, in certain embodiments, when the thermostat 102 is communicatively coupled to the HVAC system 116, the HVAC component determination logic 122 may request identification information, such as model numbers, model types, entry keys, and/or serial numbers, of the components of the HVAC system 116, for example, directly from the components and/or from the microprocessor 86 of the HVAC system 116. In certain embodiments, the microprocessor 86 may send the identification information of the components back to the HVAC component determination logic 122, for example, to enable the HVAC system 116 to store the identification information in the non-volatile memory 88. Furthermore, in certain embodiments, the thermostat 102 may use the identification information of the components of the HVAC system 116 to determine how to implement the static location-based temperature control algorithms 104 that are set for the thermostat 102. Specifically, in certain embodiments, each set of static location-based temperature control algorithms 104 may correspond not only to a particular location of the thermostat 102 with respect to the building 10 within which the thermostat 102 is installed, but also may correspond to particular components of the HVAC system 116 being controlled by the thermostat 102, for example, as identified by the identification information determined by the HVAC component determination logic 122 or conditioned air determination logic of the thermostat 102.

The HVAC system 116 may include any suitable HVAC system, such as those described above. As described in FIG. 4, the HVAC system 116 may include the control panel 82 that regulates operation of the HVAC system 116. The control panel 82 may include the microprocessor 86 and non-volatile memory 88. The HVAC system 116 may further include a communication interface 128 communicatively coupled to the control panel 82 that may enable the HVAC system 116 to send and receive control signals to and from, for example, the thermostat 102. The HVAC system 116 may include one or more indoor units 124, such as an air handler, a furnace, a coil, and/or the like. The HVAC system 116 may also include one or more outdoor units 126, such as a heat pump, an air conditioning unit, and/or the like.

In certain embodiments, the electronic computing device 118 may be any suitable device, such as a smartphone, a wearable device, a tablet, a laptop, a personal computer, and so forth. In certain embodiments, the electronic computing device 118 may be external to the thermostat 102 and/or the HVAC system 116. For example, the electronic computing device 118 may be operated by a programmer of a thermostat manufacturer to pre-program the plurality of sets of static location-based temperature control algorithms 104 into the memory 108 of the thermostat 102. In certain embodiments, the electronic computing device 118 may include a processor 130 that may control the electronic computing device 118 and a memory 132 communicatively coupled to the processor 130. In certain embodiments, the memory 132 may store information associated with the electronic computing device 118, for example, including instructions executable by the processor 130 to control operation of the electronic computing device 118 and/or the thermostat 102, as described in greater detail herein.

In certain embodiments, the electronic computing device 118 may also include a display 134 that outputs information to be viewed by the programmer. For example, the display 134 may display information related to the selection of the plurality of sets of static location-based temperature control algorithms 104 that are appropriate for a particular thermostat 102 being pre-programmed, which may then be stored in the memory 108 of the particular thermostat 102. In addition, in certain embodiments, the electronic computing device 118 may include a user interface 136 that may enable the programmer to select and store an appropriate plurality of sets of static location-based temperature control algorithms 104 for the thermostat 102 in the memory 108 of the thermostat 102. In certain embodiments, the user interface 136 may be provided via the display 134, which may be in the form of a touchscreen. Additionally or alternatively, the user interface 136 may include buttons, dials, a keypad, a trackpad, or the like.

In certain embodiments, the electronic computing device 118 may include a communication interface 138 communicatively coupled to the processor 130 that may enable the electronic computing device 118 to send and receive control signals to and from, for example, the thermostat 102. For example, the communication interface 138 may facilitate the communication of the plurality of sets of static location-based temperature control algorithms 104 for the thermostat 102 for storage in the memory 108 of the thermostat 102. The communication interface 138 may also enable the electronic computing device 118 to communicate to another electronic device via a communication network.

In certain embodiments, the processors 106, 130, 86 of the thermostat 102, the electronic computing device 118, and the HVAC system 116, respectively, may execute software programs and/or instructions relating to determining components of the HVAC system 116, determining static location-based temperature control algorithms 104 for the thermostat 102, controlling operation of the thermostat 102 and the HVAC system 116 based on the static location-based temperature control algorithms 104 for the thermostat 102, and/or the like, as described in greater detail herein. Moreover, in certain embodiments, the processors 106, 130, 86 may include one or more microprocessors, one or more "general-purpose" microprocessors, one or more special-purpose microprocessors, one or more application specific integrated circuits (ASICS), or some combination thereof. For example, in certain embodiments, the processors 106, 130, 86 may include one or more reduced instruction set (RISC) processors.

In certain embodiments, the memory devices 108, 132, 88 of the thermostat 102, the electronic computing device 118, and the HVAC system 116, respectively, may store information such as control software, look up tables, configuration data such as the static location-based temperature control algorithms 104, and/or the like, as described in greater detail herein. In certain embodiments, the memory devices 108, 132, 88 may include tangible, non-transitory, machine-readable-media, such as volatile memory, random access memory (RAM), nonvolatile memory, and/or read-only memory (ROM). In certain embodiments, the memory devices 108, 132, 88 may include one or more nonvolatile storage devices that may include read-only memory (ROM), flash memory, a hard drive, and/or any other suitable optical, magnetic, or solid-state storage medium. The memory devices 108, 132, 88 may store a variety of information and may be used for various purposes. For example, the memory devices 108, 132, 88 may store machine-readable and/or processor-executable instructions such as firmware or software for the processors 106, 130, 86 to execute, such as instructions relating to determining static location-based temperature control algorithms 104 for the thermostat 102, controlling operation of the thermostat 102 and the HVAC system 116 based on the static location-based temperature control algorithms 104 for the thermostat 102, and/or the like, as described in greater detail herein.

In certain embodiments, the communication interfaces 114, 138, 128 of the thermostat 102, the electronic computing device 118, and the HVAC system 116, respectively, may enable communication with any suitable communication network. For example, the communication interfaces 114, 138, 128 may enable the thermostat 102, the electronic computing device 118, and the HVAC system 116, respectively, to communicate via any suitable wired and/or wireless networks, for example, wiring terminals, mobile networks, WiFi networks, LAN, WAN, Internet, and/or the like. In this manner, the communication interfaces 114, 138, 128 may enable the thermostat 102, the electronic computing device 118, and the HVAC system 116 to communicate with each other, as described in greater detail herein.

In certain embodiments, the user interfaces 112, 136 of the thermostat 102 and the electronic computing device 118, respectively, may enable the thermostat 102 and the electronic computing device 118 to display output to and/or receive input from users of the thermostat 102 and the electronic computing device 118. For example, in certain embodiments, the user interfaces 112, 136 of the thermostat 102 and the electronic computing device 118 may include any suitable input and output devices, such as displays, touchscreens, styluses, keypads, and/or the like, to enable the users to receive information and perform operations associated with programming and installing the thermostat 102, as described in greater detail herein.

Figure 6:
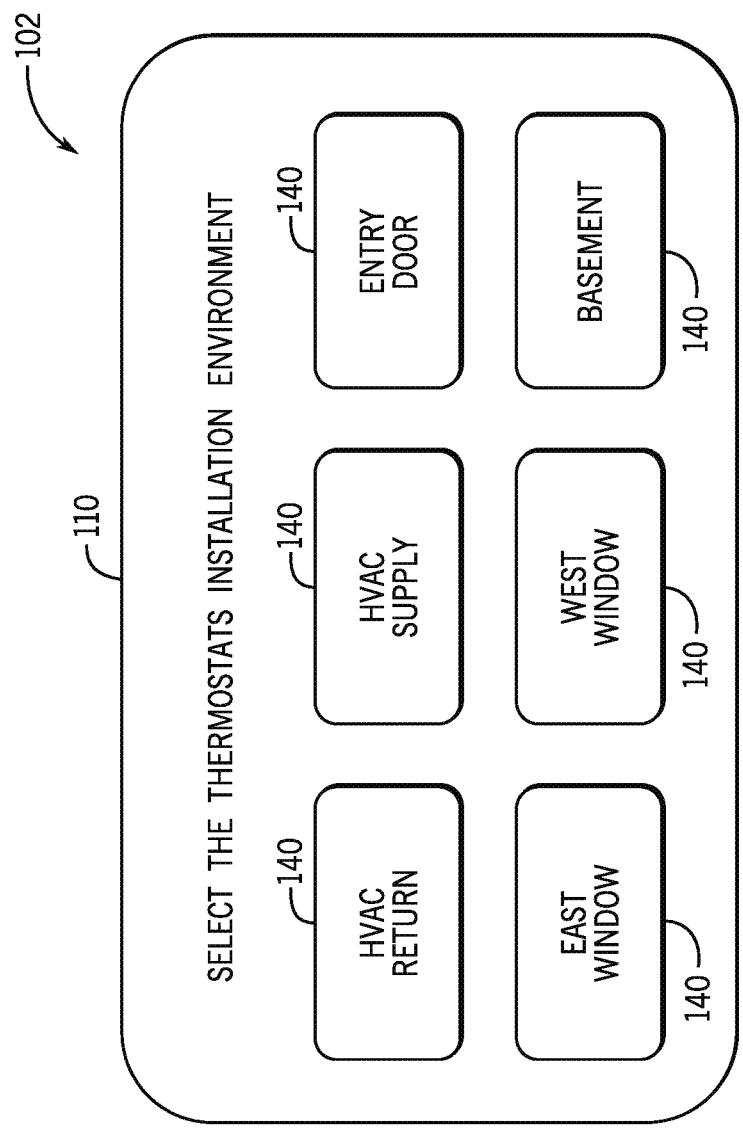
FIG. 6 illustrates an example screenshot of a display of the thermostat with a plurality of location icons available for selection, in accordance with an embodiment of the present disclosure.

For example, in certain embodiments, when the thermostat 102 is being installed by an installer or other user, the installer or other user may select a location of the thermostat 102 with respect to the building 10 within which the thermostat 102 is being installed by, for example, selecting one of a plurality of icons 140 displayed via the display 110 of the thermostat 102, which correspond to a plurality of locations within the building 10, such as an HVAC return, an HVAC supply, an entry door, an east-facing window, a west-facing window, a basement, and so forth. FIG. 6 illustrates an example screenshot of the display 110 of the thermostat 102 with a plurality of icons 140 available for selection of an installer or other user of the thermostat 102. As described in detail herein, in certain embodiments, the installer or other user may select one of the icons 140 by interacting with the display 110 in embodiments where the display 110 is a touch screen, or by interacting via other user interfaces 112 of the thermostat 102. Once the installer of other user has selected a location of the thermostat 102 that corresponds to the location at which the thermostat 102 is installed within the building 10 via the user interface 112 of the thermostat 102, the processor 106 of the thermostat 102 may use a set of static location-based temperature control algorithms 104 corresponding to the selected location to control operation of the thermostat 102 according to the particular location of the thermostat 102 within the building 10.

As described herein, in other embodiments, the thermostat 102 may additionally, or instead, receive inputs from users via a user interface 136 of an electronic computing device 118 external to the thermostat 102, such as a smartphone, a wearable device, a tablet, a laptop, a personal computer, and so forth. Indeed, in certain embodiments, the thermostat 102 may not include a display 110 or a user interface 112. In such embodiments, once the installer of other user has selected a location of the thermostat 102 that corresponds to the location at which the thermostat 102 is installed within the building 10 via the user interface 136 of the electronic computing device 118, the communication interface 138 of the electronic computing device 118 may communicate the selected location of the thermostat 102 within the building to the communication interface 114 of the thermostat 102, and the processor 106 of the thermostat 102 may use a set of static location-based temperature control algorithms 104 corresponding to the selected location to control operation of the thermostat 102 according to the particular location of the thermostat 102 within the building 10.

Figure 7:
FIG. 7 is a graph of temperature versus time for a thermostat installed near an HVAC return while the thermostat is operating in a heating mode, in accordance with an embodiment of the present disclosure.
Figure 8:
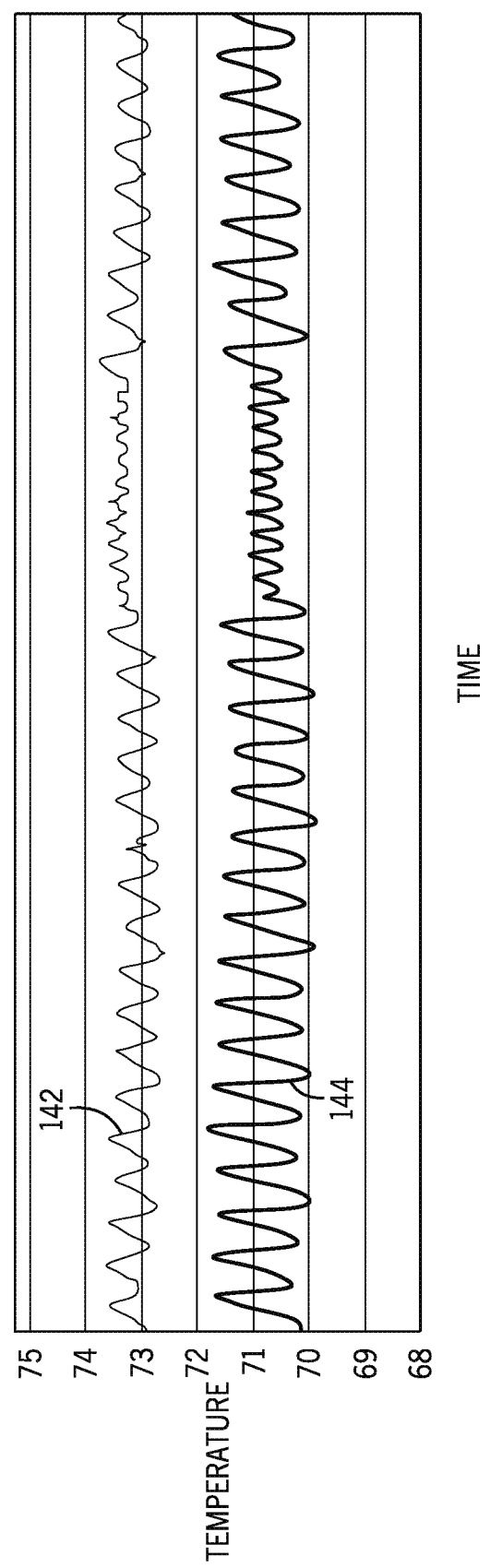
FIG. 8 is a graph of temperature versus time for a thermostat installed near an HVAC return while the thermostat is operating in a cooling mode, in accordance with an embodiment of the present disclosure.
Figure 9:
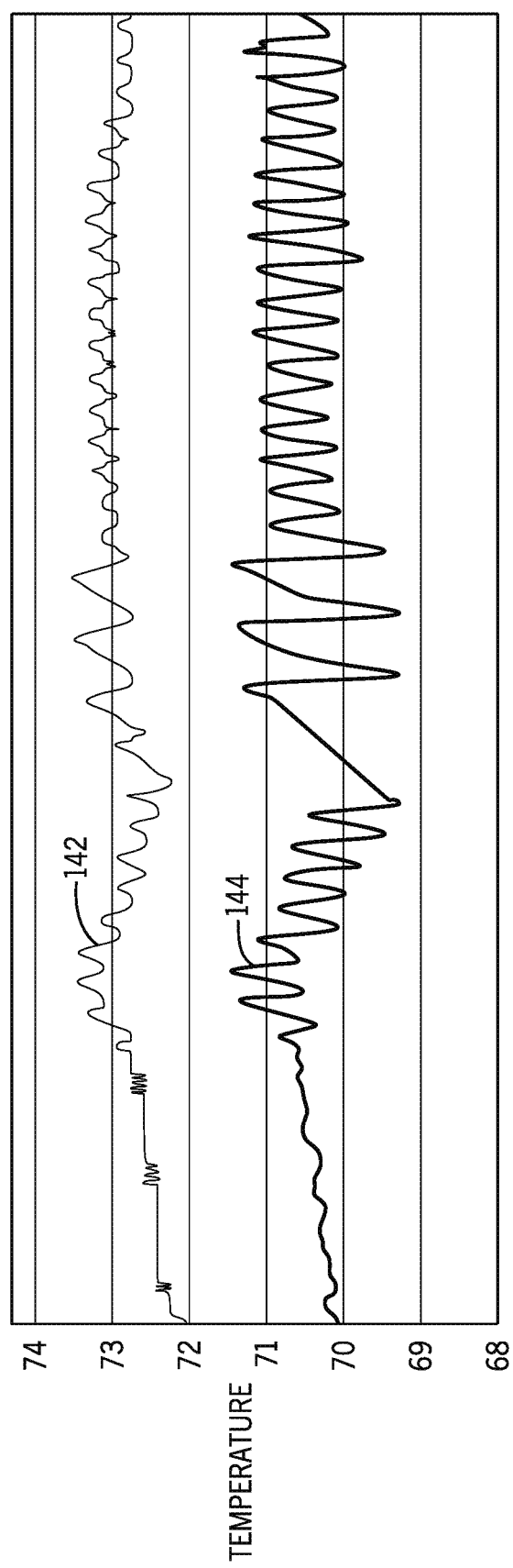
FIG. 9 is a graph of temperature versus time for a thermostat installed near an HVAC return while the thermostat is operating in an off mode, in accordance with an embodiment of the present disclosure.
Figure 10:
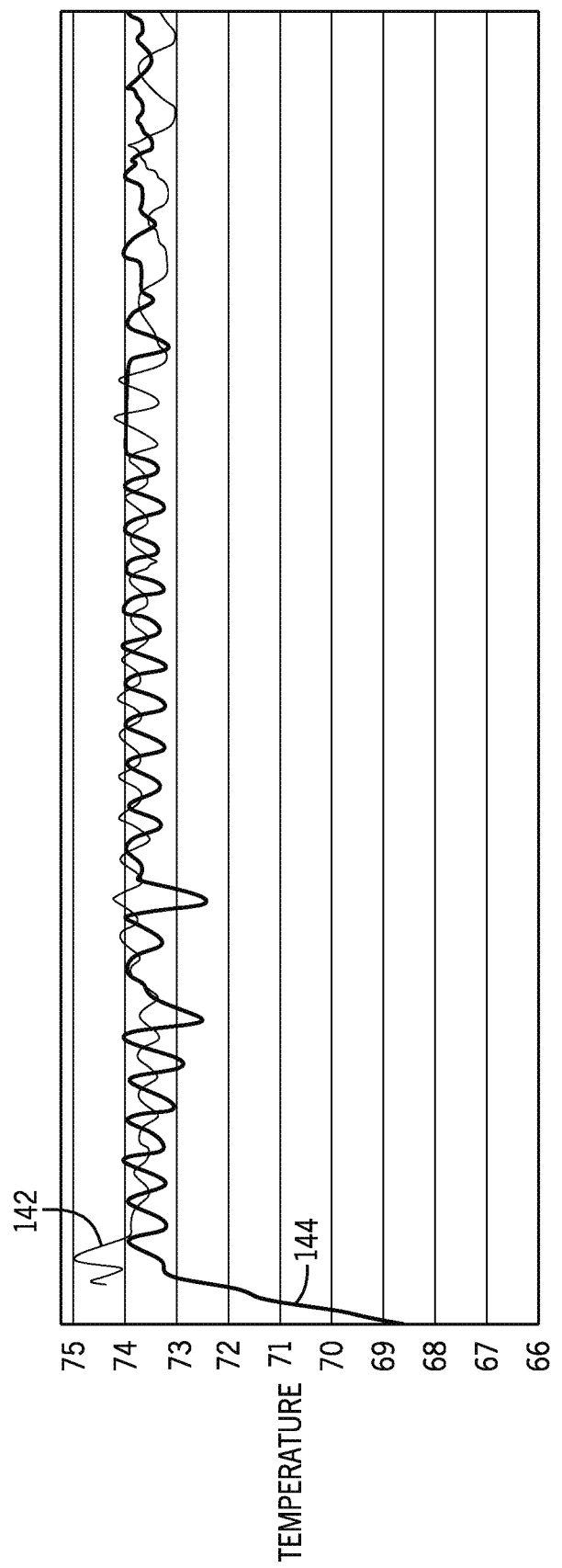
FIG. 10 is a graph of temperature versus time for a thermostat installed near an HVAC supply while the thermostat is operating in a heating mode, in accordance with an embodiment of the present disclosure.
Figure 11:
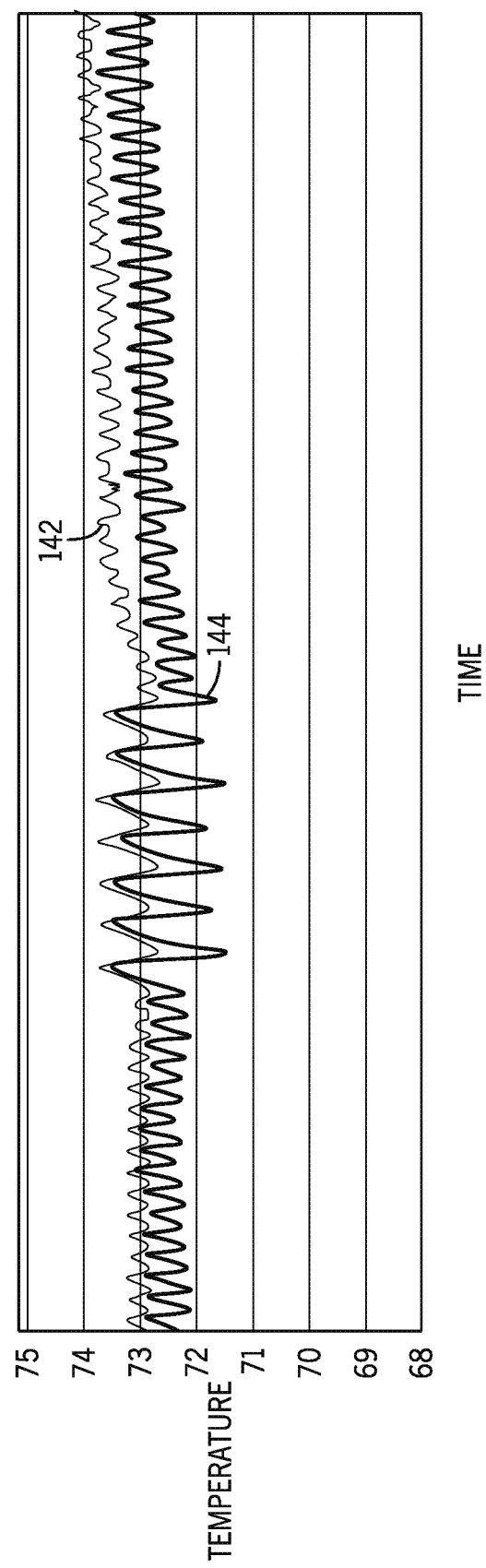
FIG. 11 is a graph of temperature versus time for a thermostat installed near an HVAC supply while the thermostat is operating in a cooling mode, in accordance with an embodiment of the present disclosure.
Figure 12:
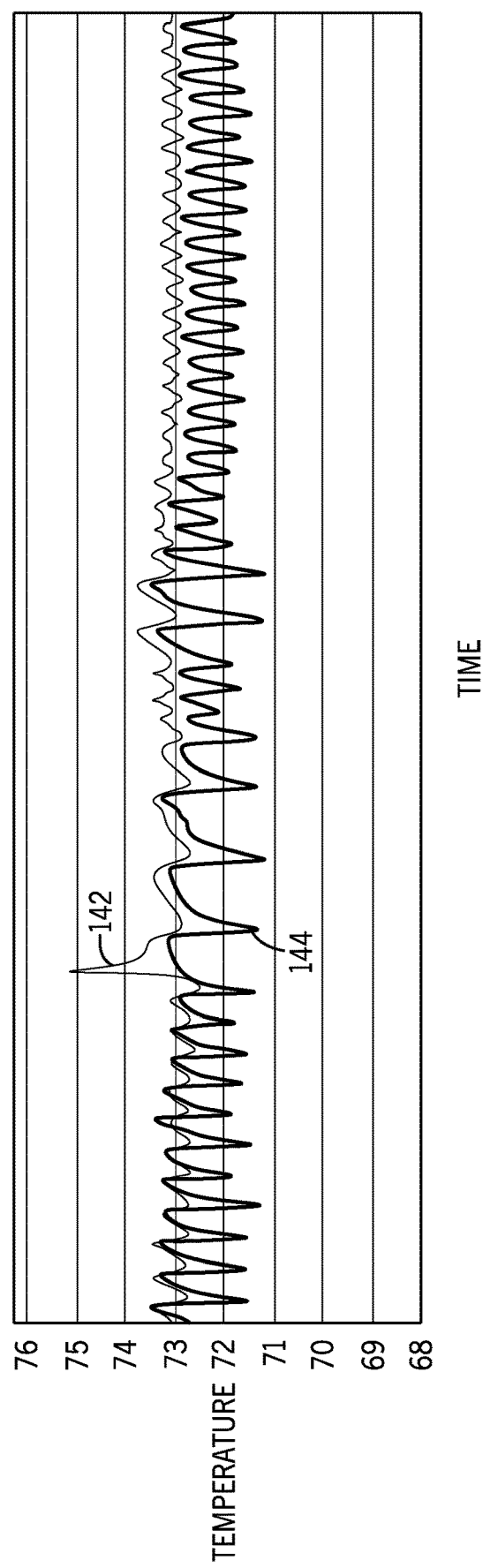
FIG. 12 is a graph of temperature versus time for a thermostat installed near an HVAC supply while the thermostat is operating in an off mode, in accordance with an embodiment of the present disclosure.

As described herein, in certain embodiments, the plurality of sets of static location-based temperature control algorithms 104, which correspond to a plurality of locations with respect to a building 10 within which the thermostat 102 may be installed, may be pre-programmed into the memory 108 of the thermostat 102 based at least in part on test data for the particular hardware of the thermostat 102. For example, FIGS. 7 through 12 illustrate test data that may be used to pre-program the static location-based temperature control algorithms 104 into the memory 108 of the thermostat 102. Specifically, FIG. 7 is a graph of temperature versus time for a thermostat 102 installed near an HVAC return while the thermostat 102 is operating in a heating mode, FIG. 8 is a graph of temperature versus time for a thermostat 102 installed near an HVAC return while the thermostat 102 is operating in a cooling mode, FIG. 9 is a graph of temperature versus time for a thermostat 102 installed near an HVAC return while the thermostat 102 is operating in an off mode, FIG. 10 is a graph of temperature versus time for a thermostat 102 installed near an HVAC supply while the thermostat 102 is operating in a heating mode, FIG. 11 is a graph of temperature versus time for a thermostat 102 installed near an HVAC supply while the thermostat 102 is operating in a cooling mode, and FIG. 12 is a graph of temperature versus time for a thermostat 102 installed near an HVAC supply while the thermostat 102 is operating in an off mode. Each of these graphs illustrate a time series 142 of test data of a calibrated temperature and a time series 144 of test data of a temperature of the thermostat 102 being pre-programmed.

Using the test data for a thermostat 102 installed near an HVAC return and operating in a heating mode, as illustrated in FIG. 7, improved start-up filtering may be implemented so that it would not take an inordinate amount of time to soak out an extreme change in ambient conditions. In addition, increased filter sampling may be implemented to reduce the amount of over/under shooting the indoor temperature. Using the test data for a thermostat 102 installed near an HVAC return and operating in a cooling mode, as illustrated in FIG. 8, again, increased filter sampling may be implemented to reduce the amount of over/under shooting the indoor temperature, and the indoor temperature may be increased by +2.5° F. to bring operation of thermostat 102 in line with the calibrated temperature. Using the test data for a thermostat 102 installed near an HVAC return and operating in an off mode, as illustrated in FIG. 9, again, increased filter sampling may be implemented to reduce the amount of over/under shooting the indoor temperature, and the indoor temperate may again be increased by +2.5° F. to bring operation of thermostat 102 in line with the calibrated temperature.

Using the test data for a thermostat 102 installed near an HVAC supply and operating in a heating mode, as illustrated in FIG. 10, improved start-up filtering may be implemented so that it would not take an inordinate amount of time to soak out an extreme change in ambient conditions. In addition, again, increased filter sampling may be implemented to reduce the amount of over/under shooting the indoor temperature. Using the test data for a thermostat 102 installed near an HVAC supply and operating in a cooling mode, as illustrated in FIG. 11, again, increased filter sampling may be implemented to reduce the amount of over/under shooting the indoor temperature, and the indoor temperature may be increased by +0.5° F. to bring operation of thermostat 102 in line with the calibrated temperature. Using the test data for a thermostat 102 installed near an HVAC supply and operating in an off mode, as illustrated in FIG. 12, again, increased filter sampling may be implemented to reduce the amount of over/under shooting the indoor temperature, and the indoor temperate may again be increased by +0.5° F. to bring operation of thermostat 102 in line with the calibrated temperature.

Figure 13:
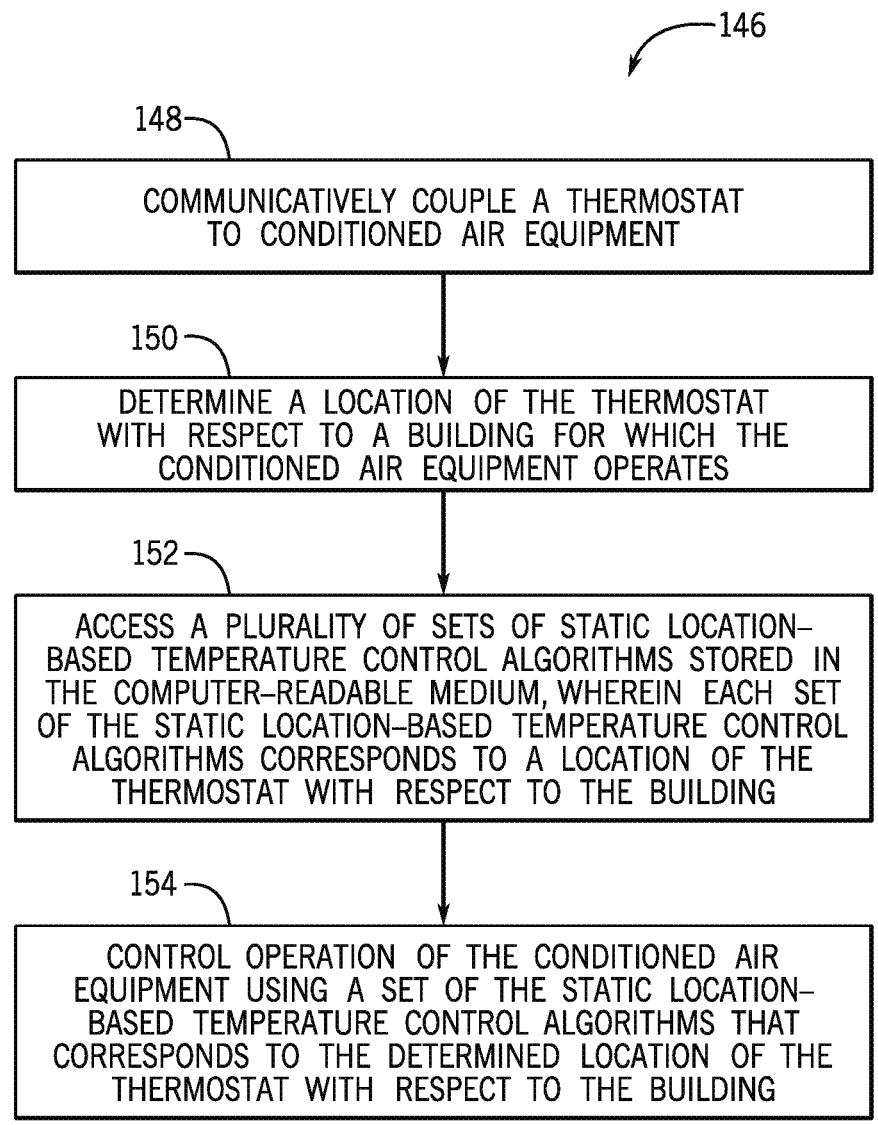
FIG. 13 illustrates a method of operation of the thermostat described herein, in accordance with an embodiment of the present disclosure.

FIG. 13 illustrates a method 146 of operation of the thermostat 102 described herein. As illustrated, in certain embodiments, the method 146 includes communicatively coupling, via a communication interface 114 of the thermostat 102, the thermostat 102 to conditioned air equipment, such as the HVAC system 116 (block 148). In certain embodiments, the method 146 also includes determining, via location determination logic 120 of the thermostat 102, a location of the thermostat 102 with respect to a building 10 for which the conditioned air equipment operates (block 150). In certain embodiments, the method 146 further includes accessing, via conditioned air equipment control logic such as the processor 106 and the memory 108 of the thermostat 102, a plurality of sets of static location-based temperature control algorithms 104, wherein each set of the static location-based temperature control algorithms 104 corresponds to a location of the thermostat 102 with respect to the building 10 (block 152). In addition, in certain embodiments, the method 146 includes controlling, via the conditioned air equipment control logic of the thermostat 102, operation of the conditioned air equipment using a set of the static location-based temperature control algorithms 104 that corresponds to the location determined by the location determination logic (block 154).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A thermostat communicatively coupled to conditioned air equipment, wherein the thermostat comprises:
   location determination logic configured to determine a location of the thermostat with respect to a building for which the conditioned air equipment operates; and
   conditioned air equipment control logic comprising a plurality of sets of static location-based temperature control algorithms, wherein each set of the static location-based temperature control algorithms corresponds to a location of the thermostat with respect to the building, and wherein the conditioned air equipment control logic is configured to control operation of the conditioned air equipment using a set of the static location-based temperature control algorithms that corresponds to the location determined by the location determination logic, and wherein controlling operation of the conditioned air equipment comprises modifying filter sampling of the thermostat in accordance with the set of the static location-based temperature control algorithms that corresponds to the location determined by the location determination logic.

2. The thermostat of claim 1, wherein the location determination logic is configured to determine the location of the thermostat with respect to the building based at least in part on an input received via a user interface of the thermostat.

3. The thermostat of claim 1, wherein the location determination logic is configured to automatically determine the location of the thermostat with respect to the building based at least in part on data received from one or more position sensors of the thermostat.

4. The thermostat of claim 1, wherein the location determination logic is configured to automatically determine a geographical location of the building based at least in part on data received from a global positioning system of the thermostat.

5. The thermostat of claim 4, wherein each set of static location-based temperature control algorithms corresponds to the determined geographical location of the building.

6. The thermostat of claim 1, comprising conditioned air equipment determination logic programmed to determine identification information of the conditioned air equipment.

7. The thermostat of claim 6, wherein each set of static location-based temperature control algorithms corresponds to the determined identification information of the conditioned air equipment.

8. The thermostat of claim 1, wherein the conditioned air equipment comprises an indoor unit, an outdoor unit, or both.

9. The thermostat of claim 8, wherein the indoor unit comprises an air handler, a furnace, a coil, or any combination thereof.

10. The thermostat of claim 8, wherein the outdoor unit comprises a heat pump, an air conditioning unit, or a combination thereof.

11. A method comprising:
    communicatively coupling, via a communication interface of a thermostat, the thermostat to conditioned air equipment;
    determining, via location determination logic of the thermostat, a location of the thermostat with respect to a building for which the conditioned air equipment operates;
    accessing, via conditioned air equipment control logic of the thermostat, a plurality of sets of static location-based temperature control algorithms, wherein each set of the static location-based temperature control algorithms corresponds to a location of the thermostat with respect to the building; and
    controlling, via the conditioned air equipment control logic of the thermostat, operation of the conditioned air equipment using a set of the static location-based temperature control algorithms that corresponds to the location determined by the location determination logic, and wherein controlling operation of the conditioned air equipment comprises modifying filter sampling of the thermostat in accordance with the set of the static location-based temperature control algorithms that corresponds to the location determined by the location determination logic.

12. The method of claim 11, comprising determining, via the location determination logic of the thermostat, the location of the thermostat with respect to the building based at least in part on an input received via a user interface of the thermostat.

13. The method of claim 11, comprising automatically determining, via the location determination logic of the thermostat, the location of the thermostat with respect to the building based at least in part on data received from one or more position sensors of the thermostat.

14. The method of claim 11, comprising automatically determining, via the location determination logic of the thermostat, a geographical location of the building based at least in part on data received from a global positioning system of the thermostat.

15. The method of claim 14, wherein each set of static location-based temperature control algorithms corresponds to the determined geographical location of the building.

16. The method of claim 11, comprising determining, via conditioned air equipment determination logic of the thermostat, identification information of the conditioned air equipment.

17. The method of claim 16, wherein each set of static location-based temperature control algorithms corresponds to the determined identification information of the conditioned air equipment.

18. A tangible, non-transitory, computer-readable medium that stores instructions executable by a processor of a thermostat that, when executed by the processor, cause the processor to:

communicatively couple the thermostat to conditioned air equipment;

determine a location of the thermostat with respect to a building for which the conditioned air equipment operates;

access a plurality of sets of static location-based temperature control algorithms stored in the computer-readable medium, wherein each set of the static location-based temperature control algorithms corresponds to a location of the thermostat with respect to the building; and control operation of the conditioned air equipment using a set of the static location-based temperature control algorithms that corresponds to the determined location of the thermostat with respect to the building, and wherein controlling operation of the conditioned air equipment comprises modifying filter sampling of the thermostat in accordance with the set of the static location-based temperature control algorithms that corresponds to the determined location of the thermostat with respect to the building.

19. The computer-readable medium of claim 18, wherein the instructions comprise instructions that, when executed by the processor, cause the processor to determine the location of the thermostat with respect to the building based at least in part on an input received via a user interface of the thermostat.

20. The computer-readable medium of claim 18, wherein the instructions comprise instructions that, when executed by the processor, cause the processor to automatically determine the location of the thermostat with respect to the building based at least in part on data received from one or more position sensors of the thermostat.

21. The computer-readable medium of claim 18, wherein the instructions comprise instructions that, when executed by the processor, cause the processor to automatically determine a geographical location of the building based at least in part on data received from a global positioning system of the thermostat, wherein each set of static location-based temperature control algorithms corresponds to the determined geographical location of the building.

22. The computer-readable medium of claim 18, wherein the instructions comprise instructions that, when executed by the processor, cause the processor to determine identification information of the conditioned air equipment, wherein each set of static location-based temperature control algorithms corresponds to the determined identification information of the conditioned air equipment.

* * * * *